J. B. & J. R. Horne,
Soldering Machine.
N° 8,940.
Patented May 11, 1852.
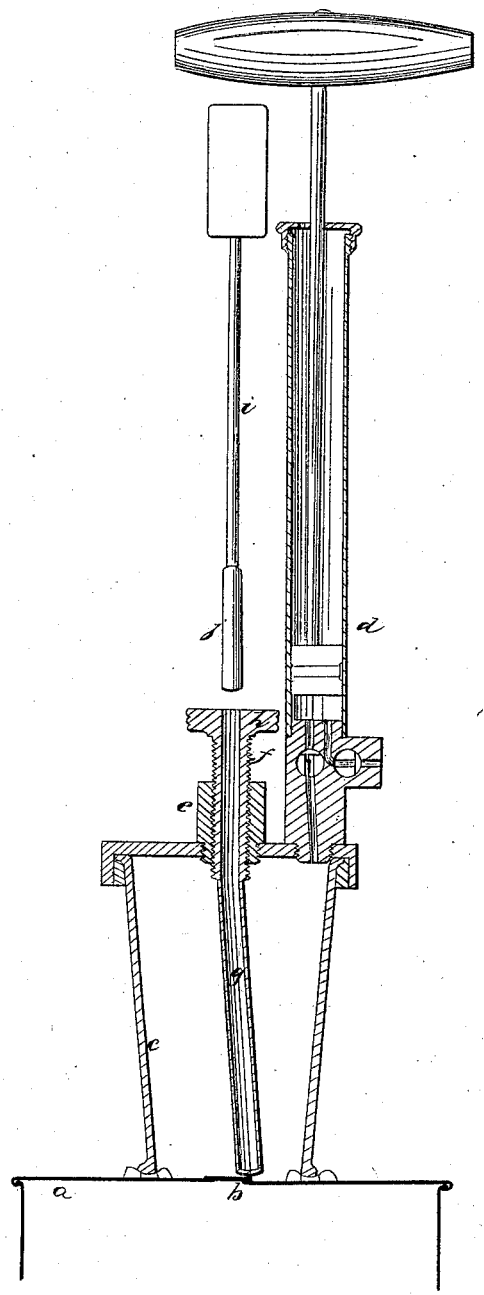

UNITED STATES PATENT OFFICE.

J. B. HORNE AND J. R. HORNE, OF XENIA, OHIO.

IMPROVEMENT IN APPARATUS FOR SOLDERING IN A VACUUM.

Specification forming part of Letters Patent No. 8,940, dated May 11, 1852.

*To all whom it may concern:*

Be it known that we, JOSEPH B. HORNE and JOHN R. HORNE, of Xenia, in the county of Greene and State of Ohio, have invented a new and useful Apparatus for Soldering in Vacuum; and we do hereby declare the following to be a full, clear, and exact description of the nature, construction, and operation thereof, reference being had to the annexed drawing, making part of this specification.

In the annexed drawing, which is an axial or central section through the apparatus, $a$ is a can, and $b$ its disk, to be soldered. $c$ is the glass receiver; $d$, the air-pump. $e$ is a gland or neck, which is screwed fast into the top of the receiver. This neck is finely screw-threaded on its inner side to fit the correspondingly-threaded exterior head $f$ of a tube, $f\ g\ h$, of which the lower portion, $g$, is as much inclined from the perpendicular as will cause the lower end of the tube to describe a circle corresponding to that of the disk to be soldered. $i\ j$ is a heater, the bit $j$ of which is made somewhat smaller than the interior of the tube.

The operation is as follows: A disk being placed over the opening, and solder laid along its edge, a piece of wet leather corresponding to the rim of the receiver is laid upon the top of the can, then the receiver being so applied that the circle described by the lower end of the tube shall correspond to that of the disk, and the air being exhausted by the pum the tube is screwed down until sufficiently near to the solder, then the red-hot bit is inserted, and the tube moved quickly round. It is necessary that the operation should be performed thus piecemeal, as otherwise the solder is liable to all run into the can.

Having thus described the nature of our invention, what we claim therein as new, and desire to secure by Letters Patent, is—

The application to the purpose of soldering in vacuum of a hollow bent tube, $f\ g\ h$, for the reception of a heater, the said tube being closed at the lower end, and provided with a screw-thread, $f$, at its upper end fitting tightly within a screw neck or collar, $e$, upon the glass receiver of an ordinary air-pump, or other suitable instrument for producing a vacuum, the bent form of the tube bringing it to bear during its rotation upon the perimeter of the circular disk which closes the aperture.

In testimony whereof we have hereunto set our hands before two subscribing witnesses.

J. B. HORNE.
J. R. HORNE.

Witnesses as to J. B. Horne:
GEO. H. KNIGHT,
P. H. HORNE, Jr.

Witnesses as to J. R. Horne:
CHAS. W. KEALHOFER,
B. NESBITT.